No. 752,037. PATENTED FEB. 16, 1904.
M. D. COMPTON.
ELECTRIC TRAIN SERVICE.
APPLICATION FILED DEC. 2, 1901. RENEWED SEPT. 12, 1903.
NO MODEL. 3 SHEETS—SHEET 1.

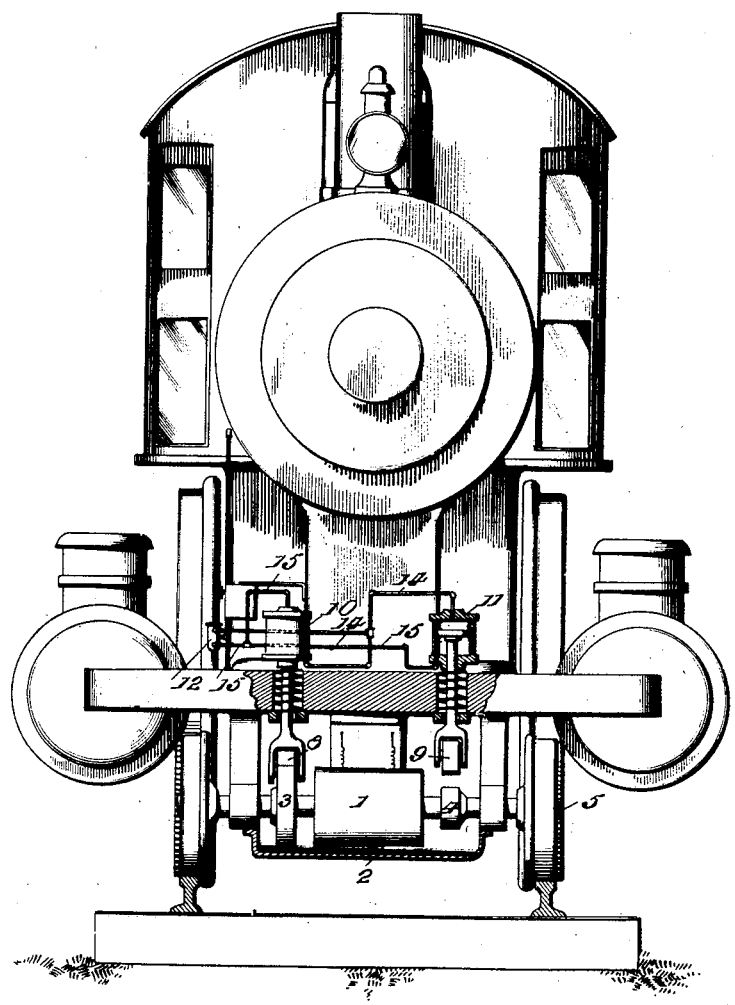

No. 752,037.

Patented February 16, 1904.

UNITED STATES PATENT OFFICE.

MELVIN D. COMPTON, OF NEW YORK, N. Y.

ELECTRIC TRAIN-SERVICE.

SPECIFICATION forming part of Letters Patent No. 752,037, dated February 16, 1904.

Application filed December 2, 1901. Renewed September 12, 1903. Serial No. 173,015. (No model.)

*To all whom it may concern:*

Be it known that I, MELVIN D. COMPTON, a citizen of the United States, residing at New York city, in the county and State of New York, have invented certain new and useful Improvements in Electric Train-Service, of which the following is a specification.

One object of the present invention is to provide for automatically regulating the speed at which the regenerator is driven from an axle or part connected therewith, so that the speed of the generator shall be substantially constant notwithstanding variations in the speed of the train.

Another object of the invention is to provide for the automatic charging and inclusion and exclusion of storage batteries, for protecting them, and for sustaining the current when the train is at rest.

Another object of the invention is to provide an efficient and reliable system for the lighting, heating, brake operation, &c., of a train by means of power derived from its axle or axles.

Another object of the invention is to provide for the location of the generator at the forward end of the locomotive, where it is comparatively free from dust and the like.

Another object of the invention is to provide suitable mechanism and devices for automatically controlling the operation of the various parts which go to make up the system.

Other objects of the invention will appear from the following description.

The invention comprises the improvements hereinafter described and claimed, and its characteristic features will be more fully understood from the following description, taken in connection with the accompanying drawings, forming part hereof, and in which—

Figure 1:
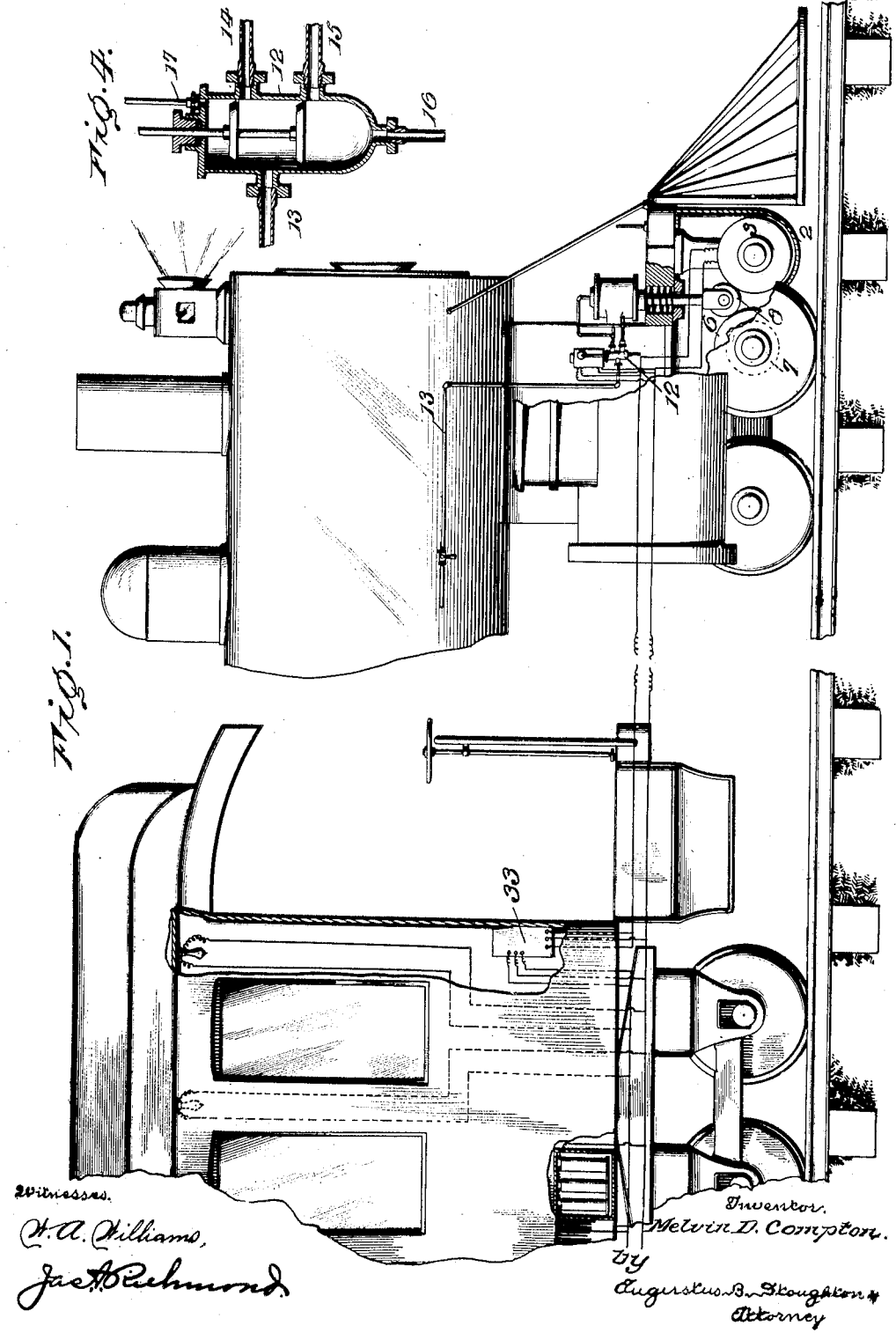
Figure 2:
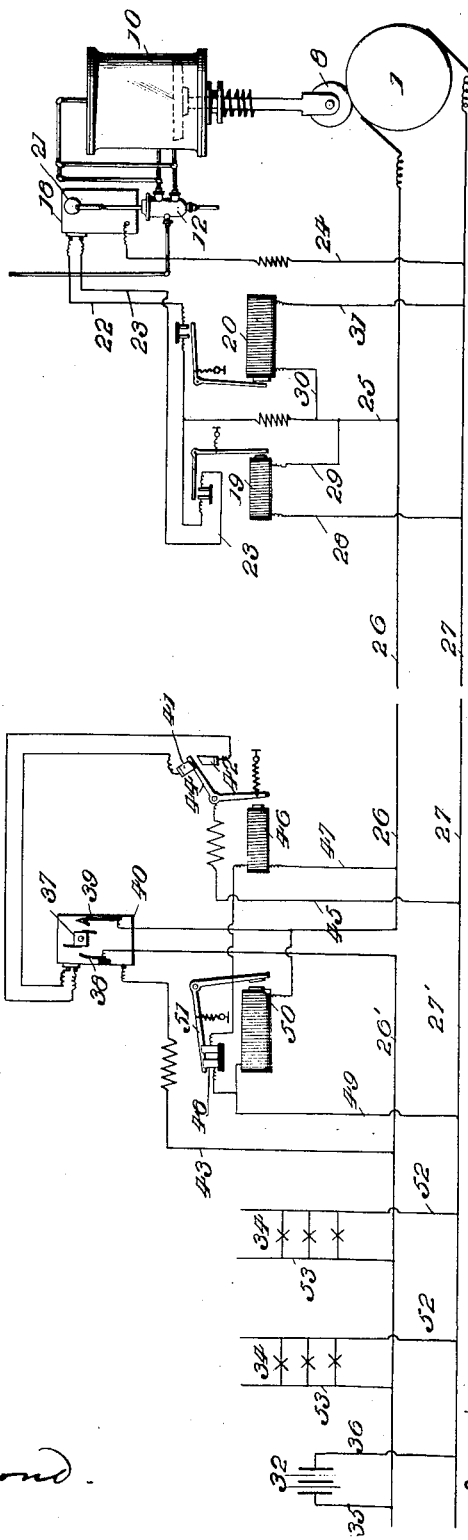

Figure 1 is a view, principally in elevation, illustrating portions of a locomotive and of a car and showing parts embodying features of my invention in application thereto. Fig. 2 is a diagrammatic view illustrative of the circuits. Fig. 3 is a front view, partly in section, of a locomotive equipped with mechanism embodying features of the invention; and Fig. 4 is a sectional view illustrating a detail of construction hereinafter referred to.

In the drawings the generator 1 is arranged at the front of the locomotive. In that position it is comparatively free from dust. As shown, the generator 1 is suspended from the pilot-frame of the locomotive by means of hangers or brackets.

2 designates a casing or housing which may be arranged around the generator and its driving mechanism, so as to keep the same free from dust, dirt, and the like. The revoluble member of the generator is free to turn in its bearings and is provided with one or more friction-disks, as 3 and 4, of which the diameters are different. The axle 5 or other revoluble part suitably connected so as to turn with it is also provided with friction-disks, of which one, 6, is shown in Fig. 1, partly in full lines, and of which the other, 7, is shown in dotted lines. The friction-disks 6 and 7 are or may be of different sizes, and they are arranged in line with the disks 3 and 4, respectively; but they are for the sake of clearness in delineation omitted from Fig. 3.

8 and 9 are intermediate driving-rolls, of which the roll 8 may be made to bear upon the disks 3 and 6 and of which the roll 9 may be made to bear upon the disks 4 and 7. These rolls are brought into action separately, so that when the roll 8 is in contact with its disks it establishes a predetermined speed relation between the driving part or axle and the driven part of the generator, which relation is appropriate to a certain range of speeds of the locomotive. When the roller 9 is brought into engagement with its disks, it establishes a different speed relation between the generator and the axle, which is appropriate to a different range of speeds of the locomotive, it being understood that the generator will operate satisfactorily within certain definite variations of armature speed, and, further, that the number of sets of disks and their complemental rollers can be increased, although but two sets are shown in the drawings. When the train is running at a comparatively slow rate of speed, it may be assumed that the disks 3 and 6 are appropriate to produce the required speed of the generator, so that the roller 8 would be in action. When the speed of the train is increased, the roller 8 would be lifted out of action and the roller 9 would be brought into action, thereby driving the generator at substantially the same speed as before, but more slowly in respect to the speed of the axle than before.

A description will now be given of mechanism well adapted to actuate the rollers 8 and 9 so as to automatically bring one or the other into action. The carriers of the rollers 8 and 9 are or may be fitted with springs. 10 and 11 are pistons and cylinders which can be availed of to force the rollers 8 and 9 into proper frictional engagement with the peripheries of their disks and also to lift them out of such position. These pistons or plungers may of course be actuated by steam, pneumatic, hydraulic, or other suitable power.

In Fig. 4 there is shown a device 12, known as a "Mason valve," and it is well adapted to control the plungers. 13 designates the pipe which conveys the actuating medium, which may be assumed to be water under pressure for actuating the plungers. This pipe 13 is shown as fitted with a hand-valve that may be used when required.

14 is a pipe which leads from the valve 12 to the bottom of the cylinder at 10 and to the top of the cylinder at 11.

15 is a pipe that leads from 12 to the top of the cylinder 10 and to the bottom of the cylinder 11. (See Fig. 3.)

16 and 17 are drip or exhaust pipes for the valve.

The valve 12 is fitted with a movable spindle carrying two plugs, as shown, so that when the spindle is in one position the passage for the actuating medium is open by way of 13 and 14 to the bottom of the cylinder 10 and the top of the cylinder 11 and the exhaust will be open by way of 16 and 15 from the top of the cylinder 10 and from the bottom of the cylinder 11. Under these conditions the roller 8 is lifted out of operation and the roller 9 is forced and held in operation in respect to its disks. When the spindle of the valve 12 is shifted, the passage is open from 13 by way of 15 to the top of the cylinder 10 and the bottom of the cylinder 11 and the exhaust to 17 is open by way of 14 from the bottom of the cylinder 10 and the top of cylinder 11, so that the roller 8 is brought and held in action and the roller 9 lifted and held out of action. To shift the spindle of the valve 12 automatically, use may be made of an electric motor, such as is explained in Letters Patent of the United States No. 540,089, granted to me on the 28th day of May, 1895, and of suitable electromagnetic switches 19 and 20 for controlling its circuit. The motor 18 possesses two peculiarities, to which attention may be called in order to facilitate a description of the invention. In the first place the crank part 21 makes a half-revolution whenever the circuit is closed by either one or the other of the conductors 22 and 23, and, second, at each half-revolution it breaks the continuity of the conductor that supplied current to make the half-revolution and also establishes the continuity of the other conductor. The crank part 21 of the motor is adapted to shift the spindle of the valve 12, and the circuit for the motor comprises three conductors 22, 23, and 24. The conductors 22 and 23 are branches of the conductor 25, so that they, as well as the conductor 25, may be regarded as positive and the conductor 24 as negative. The switch 19 and also the switch 20 comprise electromagnets whose movable armatures carry the switch-bridge pieces and are solicited away from their magnets by springs or the like. However, it requires less current to actuate the switch 19 than it does the switch 20, because these switches are properly proportioned and constructed to possess that relation. The switch 19 when closed clearly establishes a path for the circuit from the branch 25 by way of the conductor 23, and when current traverses this path the motor performs a half-revolution, shifts the spindle of the valve 12, and interrupts the conductor 23 at the motor. When the switch 20 is closed, it establishes a path for current to the motor by way of conductor 22, so that the motor makes another half-revolution and interrupts the current through the conductor 22 at the motor. Each shifting of the valve-spindle sets in motion the described mechanism and causes a change in the speed relation of the axle and generator. As the speed of the generator 1 increases, the current in its circuit 26 27 rises or increases, and contrariwise when the speed of the generator decreases the current in the circuit falls. This change in current is availed of for automatically changing the speed relation of the axle and revoluble part of the generator. For this purpose the magnets of the switches 19 and 20 are, in effect, each placed across the leads 26 and 27 by way of the conductors 28, 29, 30, and 31. The position of the parts shown in Fig. 2 corresponds with the position of the parts up to the predetermined speed at which it is desired to change the speed relation of the generator in order to compensate for increased speed of the train, and it will be understood that the roller 8 is in position for bringing the disks 6 and 3 into action, it having previously occupied that position when the train stopped. Assuming now an increase of speed of the train and of the generator up to a predetermined difference in potential across the leads 26 and 27, which difference in potential is sufficient to cause the magnet of the switch 19 to attract its armature, the conductor 23 will be interrupted by the switch and the switch will be held open and the motor 18 will not be moved. Consequently the speed-gear will not be changed. As the train speed increases the generator speed also increases, so that there is an increased difference in potential across the leads 26 and 27, and when this increased difference in potential reaches a predetermined amount the electromagnet of the switch 20 is sufficiently energized to attract its armature, thereby closing the switch 20. The result of this is to complete the motor-circuit by way of 25, 22, and 24, thus causing the motor to shift the valve-spindle and also to interrupt the circuit through the conductor 22 at the motor. The shifting of the valve-spindle operates in the manner described to throw the roller 8 out of action and to bring the roller 9 into action, with the result that the speed relation between the axle and the revoluble part of the generator is so changed that the generator runs more slowly in relation to the axle than it did before. This change in speed mechanism may reduce the difference in potential across the leads 26 and 27 somewhat and even sufficiently to permit the magnet of the switch 20 to release its armature, and thus open the switch. However, this will effect no movement of the motor. Assuming now that the train speed diminishes considerably, the result would be that the difference in potential between the leads 26 and 27 would gradually diminish until finally the magnet of the switch 29 would free its armature, so that the latter would close the switch and current passing by 25 and 23 and 25 would traverse the motor and cause it to shift the valve-spindle into position for bringing the roller 8 again into action.

From the foregoing description it is apparent that the motor and its switches and electromagnets serve to change the speed relation of the axle and revoluble part of the generator automatically and only in accordance with predetermined changes in difference in potential between the leads 26 and 27. Between the predetermined differences in potential the motor and the speed-changing devices remain at rest. It is obvious that when the train stops the generator 1 will also stop, and to sustain current at such times use is made of storage batteries 32, which may be conveniently located upon or under the cars. The leads 26 and 27 from the generator run from end to end of the train, and, as shown, the storage batteries as well as the mechanism which serves to automatically control them, is mounted on each car—for example, within a suitable housing, as 33, Fig. 1. At the left in Fig. 2 there is shown diagrammatically the equipment for one car, and this equipment will now be described. From the leads 26 and 27 is taken off a local car-circuit 26' and 27'. Across this local circuit are arranged the cells of the battery and also the translating devices 34, which are shown as lamps. When the generator 1 is running, it serves to supply current to the translating devices 34. If the battery is not fully charged, it serves to charge it, and when the battery is fully charged it is automatically cut out. However, when the generator 1 stops the battery 32, discharging by way of the wires 35 and 36, supplies current to the lamps. One side of the car-circuit is arranged to be made or broken. For example, the rotary piece 37, having arms, can be made to bridge the contacts 38 and 39 or to clear both of them. The contacts 38 and 39 are connected, respectively, with the conductors 26' and 26, which make up one side of the circuit. Clearly if this side of the circuit is made by way of the parts 37, 38, and 39 the generator, the battery, and the translating devices are all in multiple relation. However, if this side of the circuit is broken, as shown in the drawings, by reason of the position of the part 37, the translating devices 34 must take current from the battery 32, and the generator 1 may be at rest. When the train is at rest and the generator 1 is not running, the parts are in the positions shown in the drawings, and the translating devices are supplied from the battery. The side 26 26' of the circuit is automatically made and broken according to the relation of the electrical conditions developed by the generator and by the battery, according as it is more or less charged or discharged and according to the speed of the generator. The purpose of this is to protect the battery from overcharging and to insure its being properly charged and to sustain current at all times at the translating devices.

The part 40 is another of the devices explained in said Letters Patent of the United States, numbered 435,964 and granted to me on the 9th day of September, 1890. Generally speaking, it comprises a motor-driven switch. The switch provisions of it comprise the rotary part 37, provided with a bridge that coöperates with the contacts 38 39, and the peculiarity of the rotary part 37 is that it makes quarter-revolutions in the same direction and then comes to rest at each operation. The peculiarity of the motor driving part of it is that while it works on an ordinary circuit it requires three connections 41, 42, and 43, one, for example, being negative and the other two positive. When the circuit is by way of 41, the result is that the part 37 makes a quarter-revolution and then breaks the circuit 41. When the circuit is by 42, the part 37 makes another quarter-revolution and breaks the circuit 42. From this description, taken in connection with the patent referred to, it will be understood that the switch 44 can be positioned to deliver current from 27' by way of conductor 45, shown of high resistance, either to 41 or 42, and in that way the part 37 can be turned by quarter-revolutions. The conductor 43, also shown of high resistance, completes the circuit to the conductor 26'. The switch 44 is provided with an armature and a spring. The armature coöperates with a magnet 46, interposed in a conductor 47, which branches from the conductor 26, is connected with the terminals of the switch 48, and then joins a conductor 49. The latter extends from the conductor 27' through the electromagnet 50 to the conductor 26. The electromagnet 50 coöperates with an armature attached to the switch-arm 51, which in turn is acted upon by a spring. For the sake of explanation let it be assumed that the train is at rest, so that the generator 1 is generating no current and the parts of the car equipment are in the positions shown at the left-hand side of Fig. 2. Clearly the translating devices are deriving current from the battery by the following circuit: 36, 27', 52, 53, 26', and 35 back to the battery. The conductor 26' is broken at 38, and the conductor 26 is not energized. The circuit 49 and its branch 47 extend from 27' to 26, and since there is no difference in potential between 27' and 26 these circuits 47 and 49 are not energized. If the train is now started, the generator 1 generates current, and there is produced a difference of potential between 27', which is, in fact, a continuation of 27 and the conductor 26, so that current passes through the conductor 49 and its branch 47. This current under normal conditions is not sufficient to cause the magnet 50 to attract its armature; but it is sufficient to cause the magnet 46 to attract its armature. The result of this is that the switch 44 is shifted and the part 40 operates to turn the part 37, so as to bridge the contacts 38 and 39. This places the generator and the battery, in effect, in multiple-arc relation, so that they share the load between them, the battery giving and taking current, as required, and thus becoming charged. Should now the speed of the generator 1 increase with the acceleration of the train or should the battery become overcharged, the difference in potential between the conductor 26 26' and the conductor 27 27' will be sufficient to cause the magnet 50 to attract its armature, thereby breaking the continuity of the conductor 47 at 48. The magnet 46 is thereupon demagnetized, and its spring shifts the switch 44 into contact with the part 42, which causes the motor-switch 40 to turn the part 37 into position for interrupting the continuity between the conductors 26 and 26'. The result of this is of course to restore the circuit to the position shown in Fig. 2, in which case only the battery is in circuit with the translating devices and in which the generator-circuit is separate from the battery-circuit. The circuit for operating the motor provisions of the part 40 is assumed to be of high resistance and is shown as derived from the difference in potential across the battery-leads 26' and 27', although that circuit might be derived from any source of continuous supply.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. In a train-service system the combination of a generator, an axle, sets of differential gearing interposed between the axle and the generator and adapted respectively to be thrown into and out of action, means for throwing one set or sets of differential gearing out of action and another set into action, and devices responding to changes in the circuit of the generator and operating to control said means, whereby different differential gearing is brought into action to maintain the speed of the generator substantially constant.

2. In a train-service system the combination of a locomotive, a generator arranged at or near the front of the locomotive and provided with driving-disks of different diameters, a front axle provided with disks of different diameters, and rollers arranged for frictional contact with said disks, whereby the speed relation of axle and generator may be varied, substantially as described.

3. In a train-service system the combination of a locomotive having its axle fitted with disks of different diameters, a generator having disks of different diameters for driving it, intermediate rolls for said disks, pistons and cylinders for bringing one of said rollers into contact with its disks and for bringing the other roller or rollers out of action, connections and an actuating medium for actuating said pistons and cylinders, and electromechanical devices arranged in the circuit of the generator and adapted to control the connections to the cylinders, whereby a change in current automatically effects a change in speed relation between the axle and the generator, substantially as described.

4. In a train-service system the combination of a generator, a storage battery, conductors for connecting the two in multiple-arc relation and whereof one conductor is interrupted, a motor-driven switch substantially as described for making and breaking the continuity of the last-mentioned conductor, a switch and circuit connections for causing the motor-driven switch to alternately and at each movement make and break the continuity of said conductor, an electromagnet and its conductor arranged to respond to changes in potential between the continuous conductor and the part of the interrupted conductor which is on the generator side of its interruption and adapted to position said switch, a safety-switch for the last-mentioned circuit, an electromagnet arranged in a branch of said circuit and adapted to actuate the last-mentioned switch, and translating devices and their circuits on the battery side of said interruption, substantially as described.

5. A system of train-service comprising the combination of a generator arranged at the front of the train and provided with disks of different sizes for driving it and with a circuit, an axle provided with disks of different sizes operatively arranged in respect to the first-mentioned disks, intermediate rolls adapted to be thrown into and out of contact with said disks to vary the speed relation of the axle and generator, devices for shifting said rolls, electromechanical connections responding to changes in the generator-circuit and adapted to automatically control said devices, storage batteries mounted on the cars and each provided with conductors by which they are placed in multiple-arc relation in respect to the generator-circuit and of which conductors one is interrupted, translating devices and their circuits mounted on the cars and connected on the battery side of said interruption, a motor-driven switch and its connections substantially as described for making and breaking the continuity of said conductor at such interruption, and circuits and their electromechanical devices responding to changes in potential between said uninterrupted conductor and the generator side of the interrupted conductor and adapted to control said motor-driven switch, substantially as described.

6. In a system of train-service the combination with the generator-circuit which extends from end to end of the train, of a car-circuit arranged in multiple-arc relation thereto and consisting of a storage battery and a continuous and an interrupted conductor, translating devices and their circuits on the battery side of the interruption, a motor-driven switch and its connections substantially as described for making and breaking the continuity of said interrupted conductor, and electromechanical devices and their connections adapted to operate the motor-driven switch and arranged to respond to changes in potential between the continuous conductor and the part of the interrupted conductor nearest the generator-circuit, substantially as described.

7. In a system of train-service the combination of a storage battery, a generator, means for driving the generator from the axle at different speed relations, conductors for connecting the battery and the generator in multiple-arc relation and whereof one is interrupted, translating devices on the battery side of the interruption, electromechanical devices and their circuits adapted to control the means which determine the speed relation and arranged on the generator side of the interruption, a motor-driven switch substantially as described for making and breaking the continuity of said interruption, and electromechanical devices and their circuits adapted to control the motor-driven switch and arranged to respond to changes in potential between the continuous conductor and the part of the interrupted conductor which lies on the generator side of the interruption, substantially as described.

In testimony whereof I have hereunto signed my name.

MELVIN D. COMPTON.

Witnesses:
K. M. GILLIGAN,
FRANK I. KALAS.